US012710873B2

(12) United States Patent
Pereira et al.

(10) Patent No.: US 12,710,873 B2
(45) Date of Patent: Aug. 18, 2026

(54) METHODS AND DEVICES FOR REDUCING LATENCY OF READ OPERATIONS PERFORMED ON SOLID STATE DRIVES

(71) Applicant: SAMSUNG ELECTRONICS CO., LTD., Suwon-si (KR)

(72) Inventors: Rowen Alphonso Pereira, Bengaluru (IN); Saugata Das Purkayastha, Bengaluru (IN); Kumar Abhinav, Bengaluru (IN); Deepak Kumar Pattnaik, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/615,545

(22) Filed: Mar. 25, 2024

(65) Prior Publication Data

US 2024/0329842 A1 Oct. 3, 2024

(30) Foreign Application Priority Data

Mar. 31, 2023 (IN) ............................. 202341024494
Jun. 9, 2023 (IN) ............................. 202341024494

(51) Int. Cl.
*G06F 3/06* (2006.01)

(52) U.S. Cl.
CPC .......... *G06F 3/0611* (2013.01); *G06F 3/0619* (2013.01); *G06F 3/0656* (2013.01); *G06F 3/0679* (2013.01)

(58) Field of Classification Search
CPC ...... G06F 3/061; G06F 3/0619; G06F 3/0656; G06F 3/0679; G06F 3/0659; G06F 3/0655; G06F 13/161
See application file for complete search history.

(56) References Cited

U.S. PATENT DOCUMENTS 8,341,311 B1 12/2012 Szewerenko et al.
10,642,496 B2 5/2020 Benisty et al.
(Continued)

FOREIGN PATENT DOCUMENTS

WO 2021/225649 A1 11/2021

OTHER PUBLICATIONS

Kyusik Kim et al., "HMB-I/O: Fast Track for Handling Urgent I/Os in Nonvolatile Memory Express Solid-State Drives", Applied Sciences, Jun. 24, 2020, 10, 4341, 15 pages, https://doi.org/10.3390/app10124341.

(Continued)

*Primary Examiner* — Hiep T Nguyen
(74) *Attorney, Agent, or Firm* — Sughrue Mion, PLLC

(57) ABSTRACT

A method performed by a storage device for reducing latency of read operations performed on the storage device, includes: transmitting Host Memory Buffer (HMB) destination information to a host device. The HMB destination information relates to a read destination space reserved within a HMB of the host device. The method also includes receiving a read request from the host device for performing at least one data read operation on a memory of the storage device. The read request specifies data to be read from the memory of the storage device. The method further includes: performing the at least one data read operation on the memory for reading the data specified in the read request and transmitting the data read from the memory to the read destination space reserved within the HMB of the host device.

14 Claims, 5 Drawing Sheets

(56) References Cited

U.S. PATENT DOCUMENTS

| | | | | |
|---|---|---|---|---|
| 10,754,785 | B2 | 8/2020 | Zhang et al. | |
| 11,403,011 | B1 | 8/2022 | Gunda et al. | |
| 2006/0053157 | A1 * | 3/2006 | Pitts | G06F 16/148 707/999.102 |
| 2020/0150155 | A1 * | 5/2020 | Sakai | G01R 15/207 |
| 2021/0342096 | A1 * | 11/2021 | Vishne | G06F 3/0673 |
| 2023/0024420 | A1 * | 1/2023 | Kachare | G06F 3/0655 |
| 2023/0393738 | A1 * | 12/2023 | Segev | G06F 3/0611 |

OTHER PUBLICATIONS

Communication dated Aug. 23, 2024, issued by the European Patent Office in counterpart European Application No. 24167326.8.

Kyusik Kim et al., "HMB-SSD: Framework for Efficient Exploiting of the Host Memory Buffer in the NVMe SSD," IEEE Access, vol. 7, pp. 150403-150411, 2019, XP011751884.

NVM Express™, Base Specification, NVM Express, Revision 1.4c, Mar. 9, 2021, https://nvmexpress.org/wp-content/uploads/NVM-Express-1_4c-2021.06.28-Ratified.pdf, 407 pages.

Communication dated Feb. 2, 2026, issued by Intellectual Property India in counterpart Indian Patent Application No. 202341024494.

* cited by examiner

STORAGE SYSTEM (100)
HOST DEVICE (110)
HOST DEVICE (110)
MEMORY (114)
HMB (116)
READ DESTINATION SPACE (118)
HOST INTERFACE (140)
STORAGE DEVICE INTERFACE (142)
STORAGE DEVICE (120)
COMMAND RECEIVER (130)
DEVICE CONTROLLER (122)
FLASH CONTROLLER (124)
ERROR CORRECTION CODE (ECC) ENGINE (128)
FLASH MEMORY (126)
(1)
(2)
(3)
(4)
(5)
(6)
(7)
(A)
(B)
(C)

FIG. 2

STORAGE DEVICE (120)

HOST DEVICE (110)

APPLICATION (202)

230

240

232 234 236 238

242 244 246 248 250 252 254 256

METHODS AND DEVICES FOR REDUCING LATENCY OF READ OPERATIONS PERFORMED ON SOLID STATE DRIVES

CROSS-REFERENCE TO RELATED APPLICATIONS

This application claims priority to Indian Provisional Patent Application No. 20/234,1024494, filed on Mar. 31, 2023, and Indian Non-Provisional patent application Ser. No. 20/234,1024494, filed on Jun. 9, 2023, in the Indian Intellectual Property Office, the disclosures of which are incorporated by reference herein in their entireties.

BACKGROUND

1. Field

The present disclosure generally relates to storage devices. Particularly, the present disclosure relates to techniques for reducing latency of read operations performed on a storage device (e.g., a Solid State Drive (SSD) device).

2. Description of Related Art

Nowadays, most of the SSD devices have adopted Non-Volatile Memory Express (NVMe) interface protocol that offers considerably higher read/write speeds, compared to legacy interface protocols (e.g., Serial Advanced Technology Attachment (SATA) interface protocol which is used in legacy SSD devices). When NVMe is used to access a non-volatile storage included in an SSD device, the SSD device may be referred to as an NVMe SSD device.

The NVMe SSD device includes a Non-Volatile Memory (NVM) for storing data. Additionally, the NVMe SSD includes a buffer memory or an internal buffer for temporarily storing data to be written to the NVM or data to be read from the NVM of the SSD device.

In the related art, when an SSD device receives a data read request from a host device, a controller of the SSD device (also referred to as a "SSD controller") processes the data read request and performs a read operation on the NVM of the SSD device. The SSD controller reads data from the NVM and temporarily stores the read data to the internal buffer before transferring the read data to a memory of the host device.

Such data transfer involving the internal buffer (i.e., at first, transferring data from the NVM to the internal buffer and then transferring the data from the internal buffer to the host memory) increases read latency and results in more power consumption. Moreover, the requirement of the internal buffer inside the SSD device increases overall cost of the SSD device. Thus, there exist needs for improvements in the storage devices. Specifically, there exists a need for SSD devices without internal buffers, which provide at par performance in comparison to conventional SSD devices.

SUMMARY

One or more shortcomings discussed above may be overcome and additional advantages may be provided by the present disclosure. An object of the present disclosure is to eliminate the dependency on an internal buffer in the SSD devices for reducing read latency. Another object of the present disclosure is to reduce power consumption of the SSD devices. Yet another object of the present disclosure is to reduce cost of SSD devices without hampering the overall performance.

According to an aspect of the present disclosure, a method performed by a storage device for reducing latency of read operations performed on the storage device, includes: transmitting Host Memory Buffer (HMB) destination information to a host device. The HMB destination information relates to a read destination space reserved within a HMB of the host device. The method also includes receiving a read request from the host device for performing at least one data read operation on a memory of the storage device. The read request specifies data to be read from the memory of the storage device. The method further includes: performing the at least one data read operation on the memory for reading the data specified in the read request and transmitting the data read from the memory to the read destination space reserved within the HMB of the host device.

According to another aspect of the present disclosure, a method performed by a host device for reducing latency of read operations performed on a storage device, includes receiving HMB destination information from the storage device. The HMB destination information relates to a read destination space reserved within a HMB of the host device. The method also includes transmitting a read request to the storage device for performing at least one data read operation on a memory of the storage device. The read request specifies data to be read from the memory. The method further includes receiving, in the read destination space, the data read from the memory of the storage device.

According to another aspect of the present disclosure, a storage device includes: a memory configured to store data; and a controller coupled to the memory and configured to transmit HMB destination information to a host device. The HMB destination information relates to a read destination space reserved within a HMB of the host device. The controller is also configured to receive a read request from the host device for performing at least one data read operation on a memory of the storage device. The read request specifies data to be read from the memory. The controller is further configured to perform the at least one data read operation on the memory for reading the data specified in the read request and transmit the data read from the memory to the read destination space reserved within the HMB of the host device.

According to another aspect of the present disclosure, a host device includes: a Host Memory Buffer (HMB) allocated within a memory of the host device; and a controller coupled to the HMB and configured to receive HMB destination information from a storage device. The HMB destination information relates to a read destination space reserved within the HMB. The controller is also configured to transmit a read request to the storage device for performing at least one data read operation on a memory of the storage device. The read request specifies data to be read from the memory. The controller is further configured to receive, in the read destination space, the data read from the memory of the storage device.

According to another aspect of the present disclosure, a non-transitory computer readable media for reducing latency of read operations performed on storage device, the non-transitory computer readable media includes one or more instructions which, when executed by at least one processor cause the at least one processor to: transmit HMB destination information to a host device, wherein the HMB destination information relates to a read destination space reserved within a HMB of the host device; receive a read request from the host device for performing at least one data read operation on a memory of the storage device, wherein the read request specifies data to be read from the memory; perform the at least one data read operation on the memory for reading the data specified in the read request; and transmit the data read from the memory to the read destination space reserved within the HMB of the host device.

According to another aspect of the present disclosure, a non-transitory computer readable media for reducing latency of read operations performed on a storage device, the non-transitory computer readable media includes one or more instructions which, when executed by at least one processor cause the at least one processor to: receive HMB destination information from the storage device, wherein the HMB destination information relates to a read destination space reserved within a HMB of a host device; transmit a read request to the storage device for performing at least one data read operation on a memory of the storage device, wherein the read request specifies data to be read from the memory; and receive, in the read destination space, the data read from the memory of the storage device.

BRIEF DESCRIPTION OF THE DRAWINGS

The embodiments of the disclosure are illustrated in the accompanying drawings, throughout which like reference letters indicate corresponding parts in the various figures. The embodiments herein will be better understood from the following description with reference to the drawings, in which:

FIG. 2 illustrates an operational procedure involved in performing a read operation on an SSD device in accordance with an exemplary embodiment of the present disclosure;

DETAILED DESCRIPTION

Figure 1A:
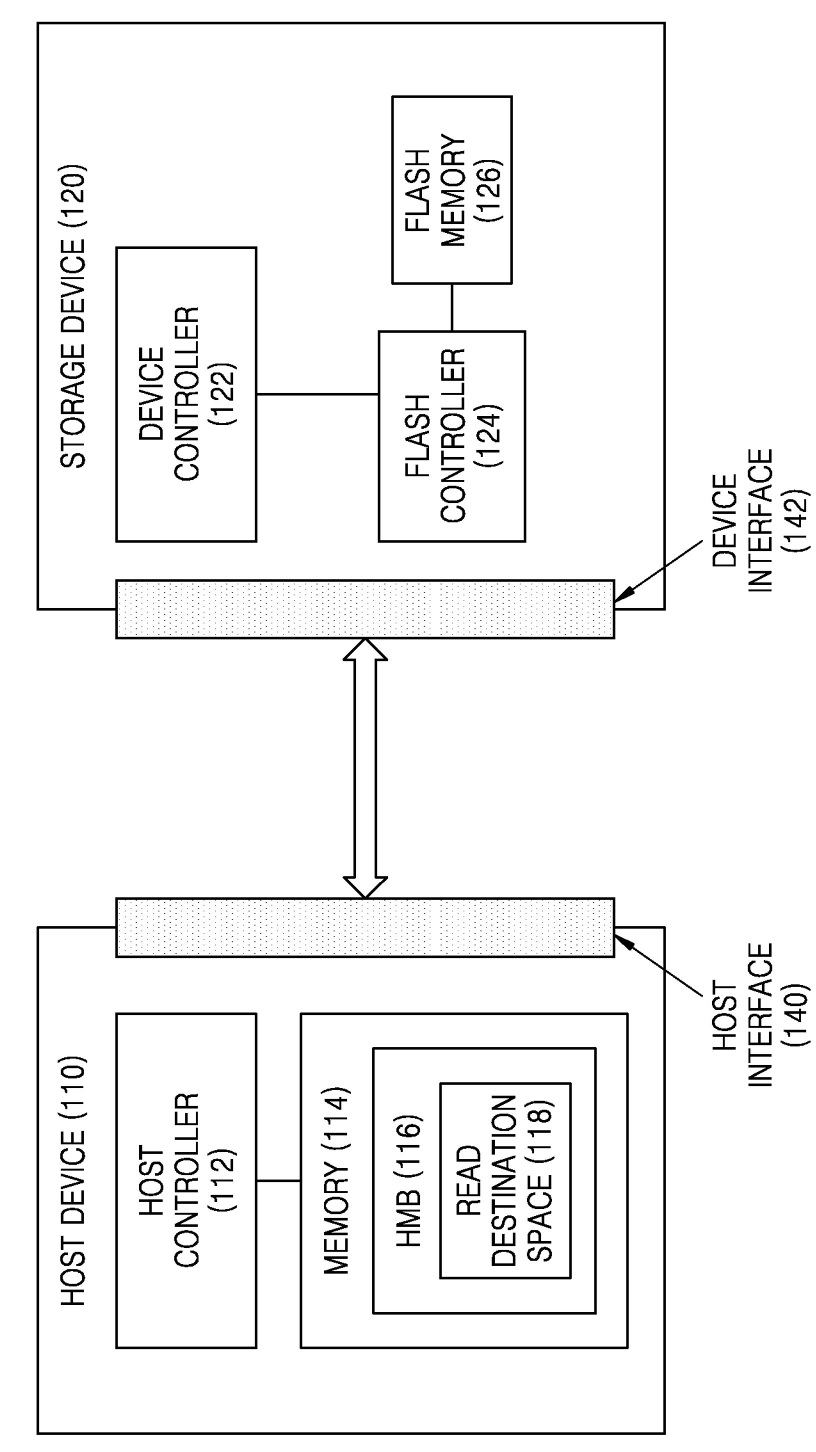
FIG. 1A illustrates an exemplary storage system showing a host device configured to communicate with a Solid State Drive (SSD) device in accordance with an exemplary embodiment of the present disclosure.

While the disclosure is susceptible to various modifications and alternative forms, specific embodiments thereof have been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms like "Solid State Drive," "SSD," and "SSD device" have been used interchangeably throughout the disclosure. Further, the terms like "host" and "host device" have been used interchangeably throughout the disclosure. The terms like "storage device interface" and "device interface" have been used interchangeably throughout the disclosure. The terms like "controller" and "processor" have been used interchangeably throughout the disclosure.

As discussed in the background section, a SSD device is a non-volatile data storage device that uses flash-based memory or semiconductor chips to store data. Generally, SSD devices have high read/write speed and faster boot time in comparison to other storage devices such as Hard Disk Drives (HDDs).

Nowadays, most of the SSD devices are adopting Non-Volatile Memory Express (NVMe) protocol that is a new storage access and transport protocol for next-generation storage devices. The NVMe protocol has introduced a feature called Host Memory Buffer (HMB) which is a state-of-the-art storage interface. A HMB enables the storage devices such as SSD devices to make use of a portion of host device's memory for caching address mapping information and/or user data. The HMB enhances performance of SSD devices that have limited memory by utilizing ample memory space of host device.

FIG. 1A illustrates an exemplary storage system 100 where the techniques consistent with the present disclosure may be implemented. As shown in FIG. 1A, the storage system 100 includes a host device 110 communicatively coupled with a storage device 120 via a host interface 140 and a storage device interface 142. The host device 110 may include at least one host controller (or a processor) 112 and a host memory 114.

The host memory 114 may store data to be transmitted to the storage device 120 or data received from the storage device 120. Likewise, the storage device 120 may include at least one device controller (or a processor) 122 and a flash controller 124 that controls access to a flash memory 126 of the storage device 120. The flash memory 126 may be a Non-Volatile Memory (NVM).

In one non-limiting embodiment, the host device 110 of FIG. 1A may be any mobile or non-mobile device such as, but not limited to, a portable communication terminal (e.g., a mobile phone), a smartphone, a tablet Personal Computer (PC), a wearable device, a healthcare device, an Internet of Things (IoT) device, a Personal Computer (PC), a laptop computer, a server, a media player, or an automotive device (e.g., a navigation device). Further, the host device 110 may include one or more image capturing means, one or more input means, one or more output means, one or more sensors, at least one display means, at least one power source, and at least one connecting interface, but not limited thereto. The host memory 114 may be a volatile memory, such as Static Random-Access Memory (SRAM) and/or Dynamic RAM (DRAM).

In one non-limiting embodiment, the host controller 112 and the host memory 114 may be implemented as separate semiconductor chips. Alternatively, in some embodiments, the host controller 112 and the host memory 114 may be integrated in the same semiconductor chip. As an example, the host controller 112 may be any one of a plurality of modules included in an Application Processor (AP). The AP may be implemented as a System on Chip (SoC). Further, the host memory 114 may be an embedded memory included in the AP or an NVM or memory module located outside the AP. The host controller 112 may manage an operation of storing data (e.g., write data) of a buffer region of the host memory 114 in the flash memory 126 or an operation of storing data (e.g., read data) of the flash memory 126 in the buffer region of the host memory 114. The host memory 114 may include one or more local buffers and a HMB 116. The HMB 116 may include a read destination space (memory) 118 for storing data read from the flash memory 126.

The storage device 120 may be a storage media configured to store data in response to requests from the host device 110. As an example, the storage device 120 may include at least one of an SSD, an embedded memory, and a removable external memory. When the storage device 120 is a SSD, the storage device 120 may be a device that conforms to the NVMe protocol. When the storage device 120 is an embedded memory or an external memory, the storage device 120 may be a device that conforms to a Universal Flash Storage (UFS) standard or an Embedded Multimedia Card (eMMC) standard.

In one non-limiting embodiment, the storage device 120 of FIG. 1A serves as a non-volatile storage device configured to store data regardless of whether power is supplied or not. The storage device 120 may include the flash memory 126 that is a NVM and may include a 2D NAND memory array or a 3D (or vertical) NAND (VNAND) memory array.

As another example, the storage device 120 may include various other kinds of NVMs. For example, the storage device 120 may include Magnetic RAM (MRAM), Spin-Transfer Torque MRAM (STT-MRAM), Conductive Bridging RAM (CB-RAM), Ferroelectric RAM (FRAM), Phase Change RAM (PRAM), Resistive RAM (RRAM), and various other kinds of non-volatile memories. In one non-limiting embodiment, the flash memory 126 may include a plurality of cells, each of which may typically store a single binary digit or bit of information.

In one non-limiting embodiment, the storage device 120 may be physically separated from the host controller 112 or implemented in the same package as the host controller 112. The storage device 120 may be removably coupled with the host device 110 through one or more interfaces such as the host interface 140 and the storage device interface 142. The host interface 140 and the storage device interface 142 may be configured to enable exchange of read/write (I/O) requests and data between the host device 110 and the storage device 120. The host interface 140 may be communicatively coupled with the host device 110 and the storage device interface 142 may be communicatively coupled with the storage device 120.

The storage device interface 142 may be implemented using various interface technologies, such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, a Universal Serial Bus (USB) interface, a Secure Digital (SD) card interface, a Multi-Media Card (MMC) interface, an eMMC interface, a UFS interface, an embedded UFS (eUFS) interface, and a Compact Flash (CF) card interface, but not limited thereto.

In one non-limiting embodiment, the host interface 140 may be a PCIe for connecting peripherals, such as NVMe-based storage device 120 with the host device 110. In one non-limiting embodiment, the storage device interface 142 may be a PCIe. The storage device interface 142 may have the ability to receive I/O commands from the host device 110 and directly access host memory 114 to connect terminal/peripheral devices to the host device 110.

Legacy storage devices (e.g., legacy SSD devices) include an internal buffer for temporarily storing data to be written to the flash memory 126 or data to be read from the flash memory 126 of the storage device 120. When the storage device receives I/O command (e.g., data read/write command), at least three stages of data transfer are performed. For example, when the storage device 120 receives a data read request from the host device 110, the device controller 122 may process the read request and perform a read operation on the flash memory 126 of the storage device 120.

In a first stage of data transfer, the device controller 122 may read data from the flash memory 126 and transfer the read data to a flash controller of the storage device 120 (e.g., for Redundant Array of Independent Disks (RAID), Low-Density Parity Check (LDPC), Memory Cyclic Redundancy check (MCRC) decoding, and error detection).

In a second stage, the device controller 122 may transfer the read data from the flash controller to the internal buffer (e.g., a read buffer) for temporarily storing the read data before transferring to the host memory 114.

In the third stage, the device controller 122 may transfer the data from the internal buffer to the host memory 114 (e.g., over a PCIE or SATA interfaces). However, as explained earlier, such data transfer involving the internal buffer increases latency of the data read/write operations and also results in significant power consumption. Also, the requirement of internal buffer inside the storage device 120 increases overall cost of the storage device 120. Moreover, the internal buffer is not desired in some storage devices 120 (e.g., in memory constrained devices like DRAM less storage devices). Thus, to overcome these problems, the present disclosure is directed to the storage device 120 (shown in FIG. 1A) that does not include the internal buffer. In the forthcoming paragraphs, the storage device 120 is considered as an NVMe-based storage device 120. However, the present disclosure is not limited thereto.

Figure 1B:
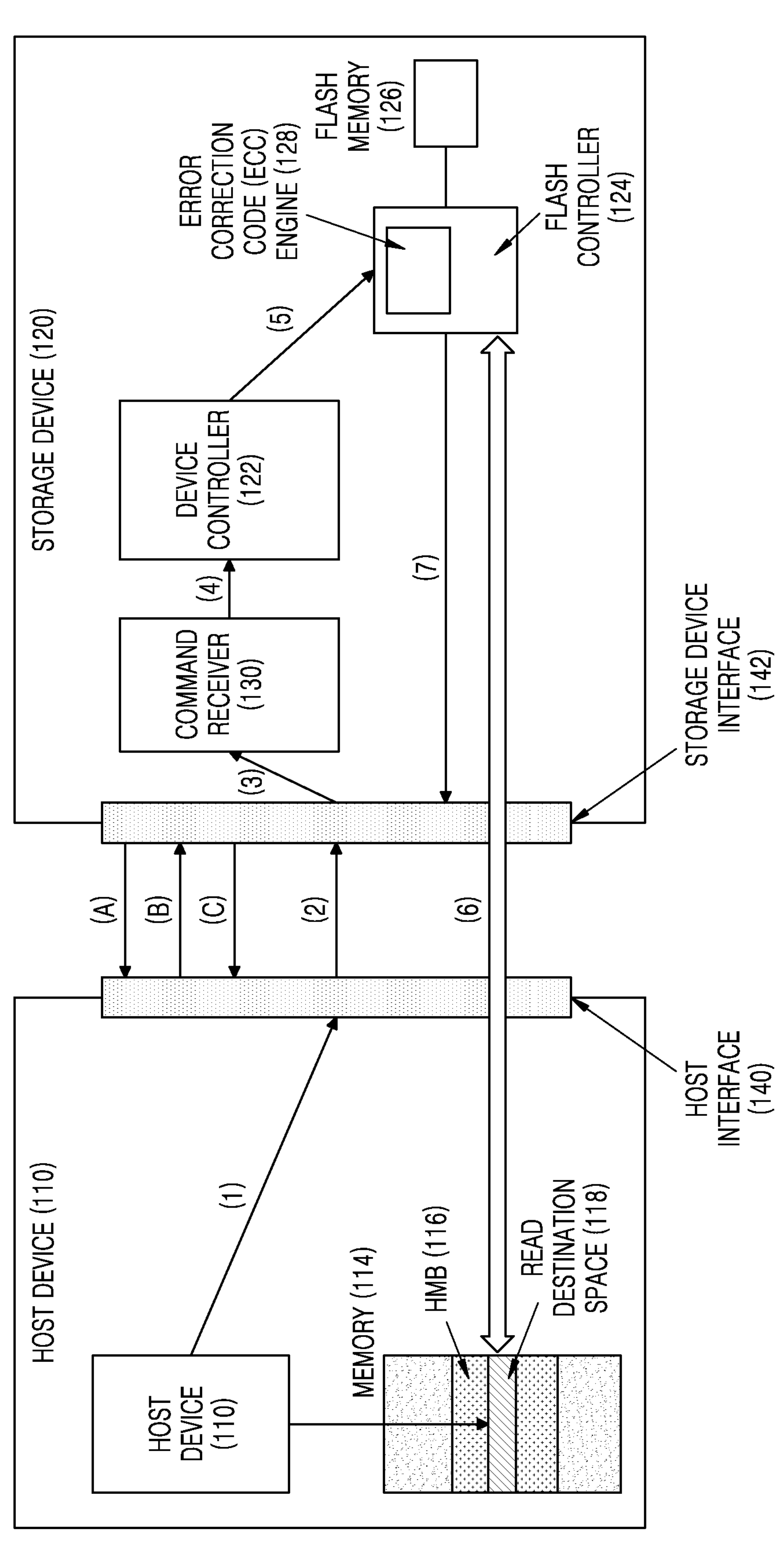
FIG. 1B illustrates the exemplary storage system in accordance with an exemplary embodiment of the present disclosure.

FIG. 1B illustrates a detailed block diagram of the exemplary storage system 100, which shows a process flow for performing a read operation on the storage device 120, in accordance with an exemplary embodiment of the present disclosure. In accordance with the present disclosure, whenever the storage device 120 is connected to the host device 110 for the first time, an SSD setup and initialization process may be performed for allocating the HMB 116 within the host memory 114.

As discussed above, the HMB 116 enables the storage device 120 to make use of a portion of the host memory 114 for caching address mapping information and/or user data. Modern operating systems and some DRAM-less SSDs support the HMB feature.

During the SSD initialization process, the host device 110 may send an identify command to the storage device 120 (more specifically, to the device controller 122), to determine whether the storage device 120 supports the HMB and to identify the HMB size needed by the storage device 120. The storage device 120 may then reply with a response message and request the host device 110 to allocate HMB 116 within the host memory 114 (operation (A)). The response message may include attributes such as a Host Memory Buffer Preferred Size (HMPRE) and a Host Memory Buffer Minimum Size (HMMIN).

The storage device 120 may inform the host device 110 whether the storage device 120 supports the HMB feature by using these attributes. For example, if a value of the attribute HMPRE is non-zero, it indicates that the storage device 120 supports the HMB feature. To use the HMB feature, both the storage device 120 and the host device 110 must support it. In one non-limiting embodiment, the storage device 120 may directly send a request to the host device 110 for allocation of the HMB 116 within the host memory 114.

In one non-limiting embodiment, in response to receiving the response message (or the request) from the storage device 120, the host device 110 may allocate the HMB 116 within the host memory 114 and send a confirmation message regarding the HMB allocation to the storage device 120 along with size and/or memory address(es) of the HMB (operation (B)). The storage device 120 may then reserve some memory space from the HMB as read destination space 118 and transmit information to the host device 110 indicating the reserved space (e.g., indicating the size and/or memory address(es) of the reserved space) (operation (C)).

The host device 110 may use the reserved space for performing read operations on the storage device 120. After the initial setup of the storage device 120 with the host device 110 is complete, the host device 110 may communicate with storage device 120 to perform memory read/write operations on the storage device 120. An exemplary memory read operation on the storage device 120 is described in the forthcoming paragraphs.

In one non-limiting embodiment, an application (e.g., a gaming application) running at the host device 110 requires some data to be read from the storage device 120. The application may initiate the data read operation for reading the required data from the storage device 120. Subsequently, the host controller 112 may prepare a read command or a read request based on the data read request from the application. The read command may include information indicating description of the read command e.g., source of read data (i.e., the application requesting the data), characteristic of read data, memory location from which the requested data is to be fetched, etc. In one non-limiting embodiment, the read command may also include information about read destination space 118 for transferring the read data. The information of the read command is needed for the host controller 112 to prepare the read command.

Once the read command is prepared, the host controller 112 may transfer the read command to the host interface 140 (operation (1)) that may forward the read command to the storage device interface 142 (operation (2)). In one non-limiting embodiment, the storage device 120 may include a command receiver 130 communicatively coupled with the storage device interface 142 and the device controller 122. The command receiver 130 may be configured to receive the read/write commands from the host device 110 via the interface 140 and forward the same to the device controller 122.

In FIG. 1B, the command receiver 130 of the storage device 120 may receive the read command from the storage device interface 142 (operation (3)) and transmit the received command to the device controller 122 for further processing (operation (4)). The device controller 122 may then instruct the flash controller 124 to perform a data read operation on the flash memory based on the information included in the received request (operation (5)).

The flash controller 124 may read the requested data from the flash memory 126 and transfer the read data to the read destination space 118 reserved on the HMB 116 (operation (6)). The data may be then transferred to an internal file system buffer of the host device 110 for eventually transferring to the application running at the host device 110.

Finally, the flash controller 124 may inform the storage device interface 142 regarding completion of read operation (operation (7)). In one non-limiting embodiment, the flash controller 124 may access the flash memory 126 through a flash interface to read the requested data. The flash interface may be helpful in maintaining a correct ordering of the data read from the flash memory 126.

In one non-limiting embodiment, the flash controller 124 may include an Error Correction Code (ECC) engine 128 to perform error detection and correction on the data read from the flash memory 126. In other words, the ECC engine 128 may be used to ensure that data read from the flash memory 126 can be error free. If errors are found, the ECC engine 128 may attempt to repair the data by correcting the errors.

In some embodiments, an inline ECC engine may be used within the flash controller 124 to allow for the correction of errors prior to the transfer of data to the host memory 114 via internal buffers. In cases when the ECC engine 128 is unable to perform error recovery, other techniques such as RAID, LDPC codes, and MCRC codes may be used to correct the errors.

In the present disclosure, since the storage device 120 does not include internal buffers, the ECC engine 128 may perform the error correction directly at the data stored in the read destination space 118. More specifically, the ECC engine 128 may generate parity bits for write data to be written to the flash memory 126 and the generated parity bits may be stored in the flash memory 126 together with the write data. Once the data is read from the flash memory 126 based on the read request and is stored in the read destination space 118, the ECC engine 128 may correct errors in the read data by using the parity bits read from the flash memory 126 along with the read data, and replace the erroneous data in the read destination space 118 with error-corrected data.

In one non-limiting embodiment, the storage device 120 may include a Direct Memory Access (DMA) engine and the SSD controller 122 or the flash controller 124 may utilize the DMA engine for transferring the read data from the flash memory directly into the HMB 116.

In one non-limiting embodiment, the flash controller 124 of the storage device 120 may include other elements such as, but not limited to, a Flash Translation Layer (FTL) and an Advanced Encryption Standard (AES) engine. The FTL may perform various functions, such as an address mapping operation, a wear-leveling operation, and a garbage collection operation. The address mapping operation may be an operation of converting a logical address received from the host device 110 into a physical address used to actually store data in the flash memory 126.

The wear-leveling operation may be a technique for preventing excessive deterioration of a specific block by allowing blocks of the flash memory 126 to be uniformly used. As an example, the wear-leveling operation may be implemented using a firmware technique that balances erase counts of physical blocks. The garbage collection operation may be a technique for ensuring usable capacity in the flash memory 126 by erasing an existing block after copying valid data of the existing block to a new block. The AES engine may perform at least one of an encryption operation and a decryption operation on data input to the device controller 122 by using a symmetric-key algorithm.

In one non-limiting embodiment, the host controller 112 may manage the read destination space 118 by reserving space within the read destination space 118 for a read request. For each read request, the host controller 112 may allocate one or more buffers within the read destination space for temporarily storing the requested data read from the flash memory 126 before the requested data is being transmitted to the application. Once the requested data is transmitted to the application, the host controller 112 may free up the space occupied by the requested data.

Figure 2:
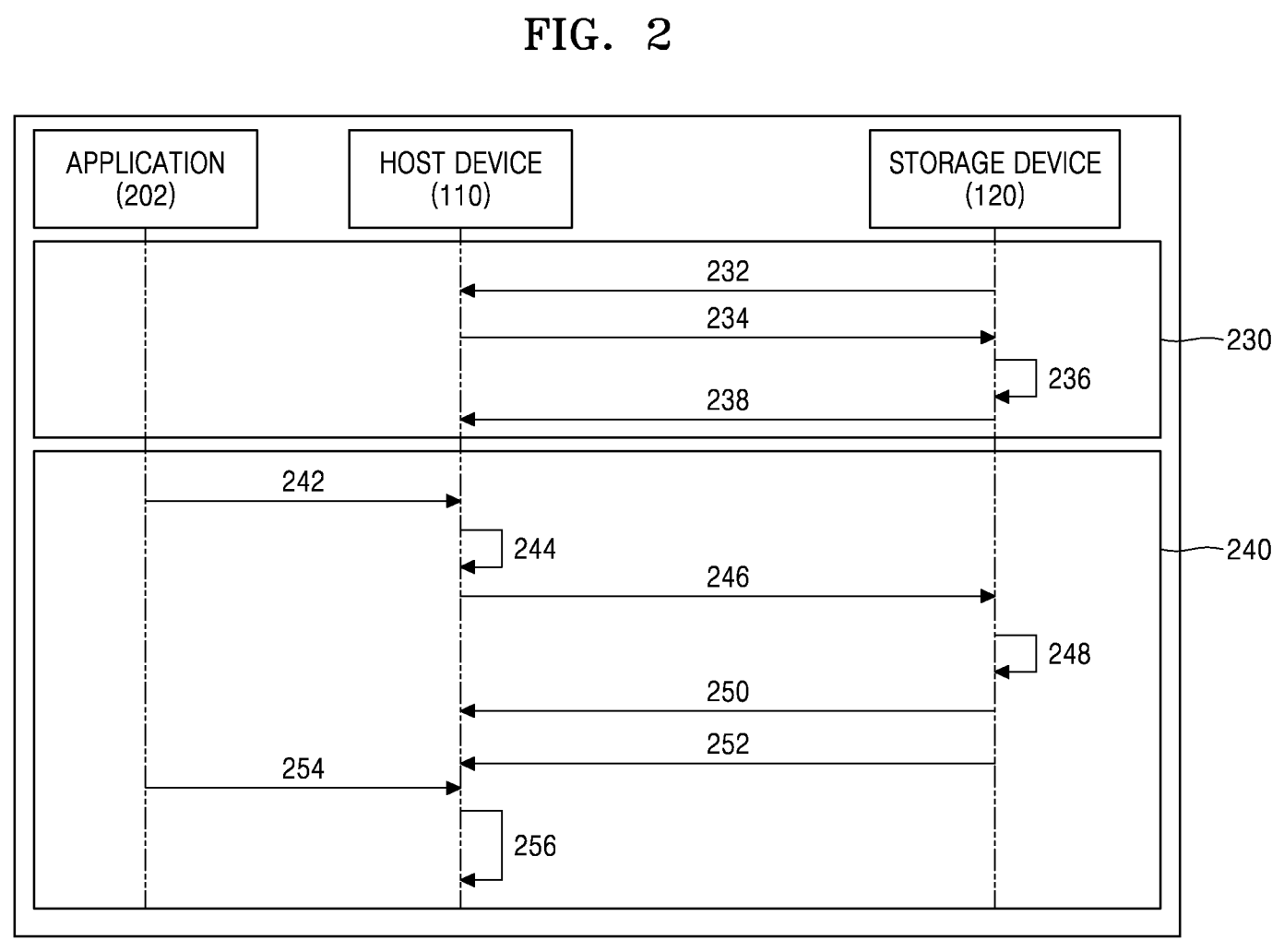

FIG. 2 illustrates a sequence diagram 200 for performing a read operation on the storage device 120 (e.g., an NVMe SSD device), in accordance with an exemplary embodiment of the present disclosure. FIG. 2 summarizes the various operations discussed in conjunction with FIG. 1B.

As shown in FIG. 2, whenever the storage device 120 is connected to the host device 110 for the first time, an SSD initialization process may be performed (block 230). During the SSD initialization process, initially at operation 232, the storage device 120 may transmit a request to the host device 110 for allocation of the HMB 116 in the host memory 114.

In one non-limiting embodiment, the request to the host device 110 may be sent in response to an identify command received from the host device 110. Upon receiving the request from the storage device 120, the host device 110 may allocate the HMB 116 within the host memory 114 and send a confirmation message to the storage device 120 regarding the HMB allocation (operation 234).

In response to receiving the confirmation from the host device 110, the storage device 120 may reserve some memory space from the HMB 116 as read destination space 118 and transmit HMB destination information to the host device 110 (operation 236 and operation 238). The HMB destination information may relate to the read destination space 118 reserved within the HMB 116 for temporarily storing the read from the flash memory 126. The host device 110 may then start managing the read destination space 118.

Next, block 240 of FIG. 2 illustrates various operations involved in performing data read operation on the storage device 120. Initially an application 202 running at the host device 110 may require some data to be read from the storage device 120. The application may initiate the data read operation in order to acquire the required data (operation 242).

The host controller 112 may allocate or reserve one or more read buffers within the read destination space 118 for storing the required data (operation 244). At operation 246, the host device 110 may prepare and send the read request to the storage device 120.

In response, the storage device 120 may perform a data read operation on the flash memory 126 (operation 248). At operation 250, the storage device 120 transmits the data read from the flash memory 126 to the one or more buffers reserved within the read destination space 118 on the host device 110.

Additionally, error correction may also be performed at the read destination space 118 (specifically to detect and correct errors in the data stored on the one or more buffers). At operation 252, the storage device 120 informs the host device 110 about completion of the read operation at SSD device's end.

At operation 254, the read data is then returned to the application that initiated the read request. In one non-limiting embodiment, the data may be transferred to an internal file system buffer of the host device 110 for eventually transferring to the application the initiated the read request. Finally at operation 256, the read data may be deleted from the read destination space 118 and the read destination space 118 may be released. This completes the data read operation (block 240).

In storage devices in the relevant art, an internal buffer within the storage device 120 is needed for performing the data read operation on the storage device 120. Specifically, the read data is temporarily stored in the internal buffer before being transmitted to the host device 110. Also, in such storage devices, the data read from the flash memory 126 may be sent to an error correction unit, which further includes an internal buffer for performing error correction on read data. Thus, the transfer of read data to the host device 110 incurs a delay due to the internal transfer of data to the one or more internal buffers.

In contrast, the present disclosure eliminates dependency on internal buffers and supports direct data transfers from the flash memory 126 to the host device 110. Thus, the techniques of the present disclosure reduce latency in data read operations performed on the storage device 120 and also reduce power consumption of the storage device 120. Additionally, since there are no internal buffers within the storage device 120, the cost of the storage device 120 is reduced without hampering the overall performance of the storage device 120.

Figure 3:
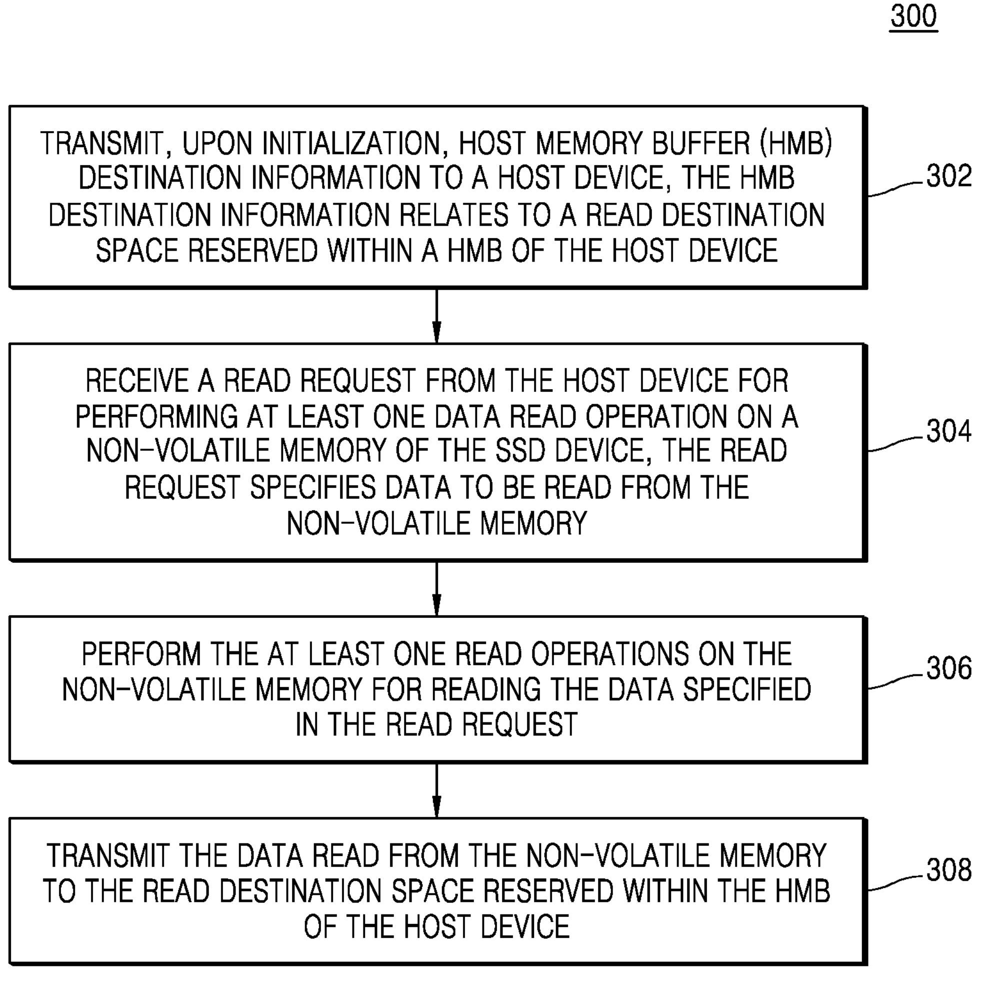
FIG. 3 illustrates an operational procedure for reducing latency of read operations performed on an SSD device in accordance with an exemplary embodiment of the present disclosure.

FIG. 3 illustrates a flow chart of an operational procedure 300 for reducing latency while performing data read operations on a storage device 120, in accordance with an exemplary embodiment of the present disclosure. The operational procedure 300 may be performed by the storage device 120 (particularly, using the device controller (the processor) 122 of the storage device 120).

The operational procedure 300 may include, at block 302 of FIG. 3, upon SSD initialization, transmitting HMB destination information to the host device 110. The HMB destination information may relate to a read destination space 118 reserved within a HMB 116 of the host device 110.

The operational procedure 300 may further include, at block 304, receiving a read request from the host device 110 for performing at least one data read operation on the storage device 120. The read request may specify the data to be read from a flash memory 126 of the storage device 120.

Subsequently, at block 306, the operational procedure 300 may include performing the at least one data read operation on the non-volatile memory for reading the data specified in the read request.

Finally, at block 308, the operational procedure 300 may include transmitting the data read from the flash memory 126 to the read destination space 118 reserved within the HMB 116 of the host device 110.

In one non-limiting embodiment, the operational procedure 300 may further include transmitting, upon SSD initialization, a request to the host device 110 for allocating the HMB 116 within a memory of the host device 110 and receiving confirmation from the host device 110 of the allocation of HMB 116. The operational procedure 300 may further include reserving the read destination space 118 within the HMB 116 for temporarily storing the data read from the flash memory 126.

In another non-limiting embodiment, the operational procedure 300 may further include transmitting a request to the host device 110 for performing error correction on the read data that is stored in the read destination space 118. In one non-limiting embodiment, the transmitting of the request to the host device 110 for allocating the space in the HMB 116 includes specifying at least one of a HMB Preferred Size (HMPRE) and a HMMIN in the request.

Figure 4:
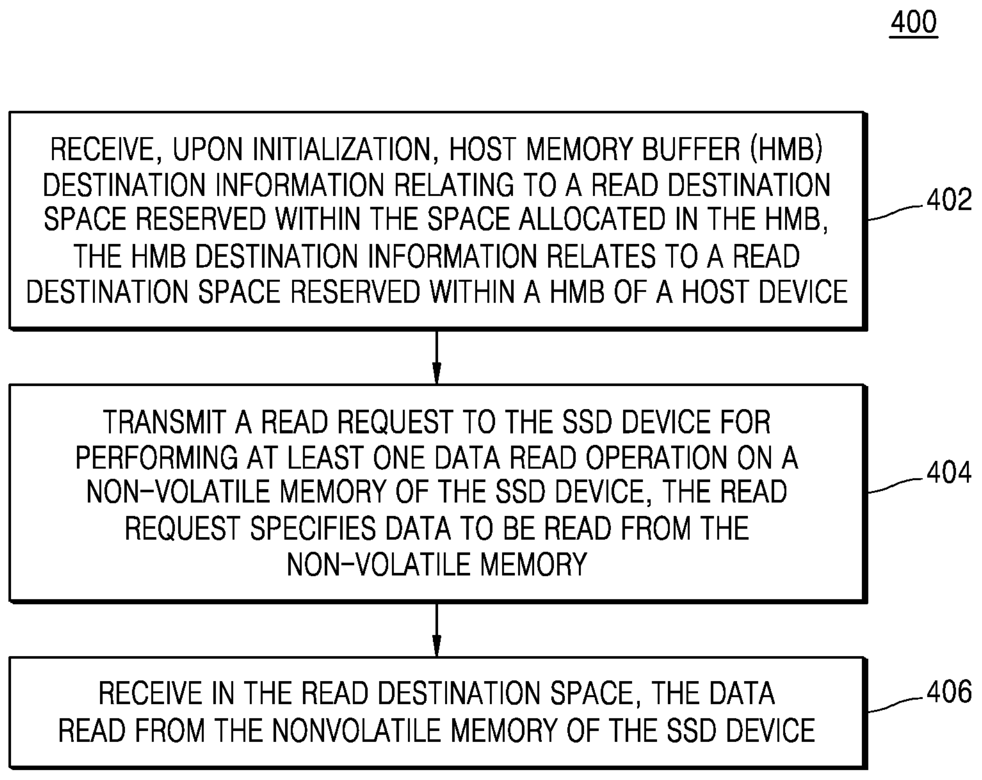
FIG. 4 illustrates another operational procedure for reducing latency of read operations performed on an SSD device in accordance with an exemplary embodiment of the present disclosure.

FIG. 4 illustrates an operational procedure 400 for reducing latency of read operations performed on a storage device 120, in accordance with an exemplary embodiment of the present disclosure. The operational procedure 400 may be performed by the host device 110 (particularly, using the host controller 112 of the host device 110).

At block 402, the operational procedure 400 includes receiving, upon initialization, HMB destination information from the storage device 120. The HMB destination information may relate to a read destination space 118 reserved within a HMB 116 of the host device 110.

The operational procedure 400 further includes, at block 404, transmitting at least one data read request to the storage device 120 for performing read operations on a flash memory 126 of the storage device 120. The read request specifies data to be read from the flash memory 126.

At block 406, the operational procedure further includes receiving, in the read destination space 118, the data read from the flash memory 126 of the storage device 120.

In another non-limiting embodiment, the operational procedure 400 may further include receiving a request from the storage device 120 for allocating the HMB 116 within the host memory 114 and transmitting confirmation, to the storage device 120, of the allocation of the HMB 116. In another non-limiting embodiment, the operation of transmitting the read request to the storage device 120 may be initiated by an application 202 running on the host device 110.

In another non-limiting embodiment, the operational procedure 400 may further include managing the read destination space 118 by allocating one or more buffers within the read destination space 118 for temporarily storing the data read from the flash memory 126, and releasing the one or more buffers after completion of the at least one read operation.

In another non-limiting embodiment, the operational procedure 400 may further include copying the data from the read destination space 118 to an internal file system buffer of the host device 110 upon completion of the at least one read operation. In another non-limiting embodiment, the request from the storage device 120 for allocating the space in the HMB 116 may include at least one of a HMPRE and a HMMIN in the request. In another non-limiting embodiment, the operational procedure 400 may further include performing error correction on the data stored at the read destination space 118.

The operational procedures 300, 400 may be described in the general context of computer executable instructions. Generally, computer executable instructions can include routines, programs, objects, components, data structures, procedures, modules, and functions, which perform specific functions or implement specific abstract data types.

The order in which the various operations of the operational procedures are described is not intended to be construed as a limitation, and any number of the described operational procedure blocks can be combined in any order to implement the operational procedure. Additionally, individual blocks may be deleted from the operational procedures without departing from the spirit and scope of the subject matter described herein. Furthermore, the operational procedures can be implemented in any suitable hardware, software, firmware, or combination thereof.

The operational procedures described above may be performed by any suitable means capable of performing the corresponding functions. The means may include various hardware and/or software component(s) and/or module(s) shown in FIGS. 1A and 1B. Generally, where there are operations illustrated in Figures, those operations may have corresponding counterpart means-plus-function components. It may be noted here that the subject matter of some or all embodiments described with reference to FIGS. 1 and 2 may be relevant for the operational procedures 300, 400 and the same is not repeated for the sake of brevity. Further, the present disclosure has been explained by considering the storage device as NVMe SSDs. However, it may be noted that the teachings of the present disclosure are equally applicable for other types of DRAM-less NVMe storage devices.

In a non-limiting embodiment of the present disclosure, one or more non-transitory computer-readable media may be utilized for implementing the embodiments consistent with the present disclosure. Certain aspects may include a computer program product for performing the operations presented herein. For example, such a computer program product may include a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method performed by a storage device for reducing latency of read operations performed on the storage device, the method comprising:

transmitting Host Memory Buffer (HMB) destination information to a host device, wherein the HMB destination information indicates a read destination space that is located within a HMB of the host device and that is reserved by the storage device;

receiving a read request from the host device for performing at least one data read operation on a memory of the storage device, wherein the read request specifies data to be read from the memory of the storage device;

performing the at least one data read operation on the memory for reading the data specified in the read request;

transmitting the data read from the memory to the read destination space reserved within the HMB of the host device;

transmitting error-corrected data of the transmitted data to replace the transmitted data; and transmitting information of completion of the at least one read operation.

2. The method of claim 1, further comprising:

transmitting a request to the host device for an allocation of the HMB within a memory of the host device;

receiving confirmation, from the host device, of the allocation of the HMB; and reserving the read destination space within the HMB for temporarily storing the data read from the memory.

3. The method of claim 1, further comprising transmitting a request to the host device for performing error correction on the data stored in the read destination space.

4. The method of claim 2, wherein transmitting the request to the host device for allocating the HMB comprises specifying at least one of a HMB preferred size (HMPRE) and a Host Memory Buffer Minimum Size (HMMIN) in the request.

5. A method performed by a host device for reducing latency of read operations performed on a storage device, the method comprising:

receiving Host Memory Buffer (HMB) destination information from the storage device, wherein the HMB destination information indicates a read destination space that is located within a HMB of the host device and that is reserved by the storage device;

transmitting a read request to the storage device for performing at least one data read operation on a memory of the storage device, wherein the read request specifies data to be read from the memory;

receiving, in the read destination space, the data read from the memory of the storage device;

receiving error-corrected data of the received data to replace the received data; and receiving information of completion of the read operation.

6. The method of claim 5, further comprising:

receiving a request from the storage device for an allocation of the HMB within a memory of the host device; and transmitting confirmation, to the storage device, of the allocation of the HMB.

7. The method of claim 5, wherein the transmitting of the read request to the storage device is initiated by an application running on the host device.

8. The method of claim 5, further comprising managing the read destination space by:

allocating one or more buffers within the read destination space for temporarily storing the data read from the memory; and releasing the one or more buffers after completion of the at least one read operation.

9. The method of claim 5, further comprising copying the data from the read destination space to an internal file system buffer of the host device upon completion of the at least one data read operation.

10. The method of claim 6, wherein received request from the storage device for allocating the space in the HMB comprises at least one of a HMB preferred size (HMPRE) and a host memory buffer minimum size (HMMIN).

11. The method of claim 5, further comprising performing error correction on the data stored in the read destination space.

12. A storage device comprising:

a memory configured to store data; and a controller coupled to the memory and configured to:

transmit Host Memory Buffer (HMB) destination information to a host device, wherein the HMB destination information indicates a read destination space that is located within a HMB of the host device and that is reserved by the storage device;

receive a read request from the host device for performing at least one data read operation on a memory of the storage device, wherein the read request specifies data to be read from the memory;

perform the at least one data read operation on the memory for reading the data specified in the read request;

transmit the data read from the memory to the read destination space reserved within the HMB of the host device;

transmit error-corrected data of the transmitted data to replace the transmitted data; and transmit information of completion of the at least one read operation.

13. The storage device of claim 12, wherein the controller is further configured to:

transmit a request to the host device for an allocation of the HMB within a memory of the host device;

receive confirmation, from the host device, of the allocation of the HMB; and reserve the read destination space within the HMB for temporarily storing the data read from the memory.

14. The storage device of claim 12, wherein the controller is further configured to transmit a request to the host device for performing error correction on the data which is stored in the read destination space.

* * * * *